June 27, 1967     W. RINDNER ET AL     3,328,649

SEMICONDUCTOR TRANSDUCERS

Filed March 28, 1963

INVENTORS
WILHELM RINDNER
ROGER F. NELSON
BY *Francis J. Thornton*
ATTORNEY

United States Patent Office

3,328,649
Patented June 27, 1967

3,328,649
SEMICONDUCTOR TRANSDUCERS
Wilhelm Rindner, Lexington, and Roger F. Nelson, Melrose, Mass., assignors to Raytheon Company, Lexington, Mass., a corporation of Delaware
Filed Mar. 28, 1963, Ser. No. 268,772
3 Claims. (Cl. 317—234)

This invention relates generally to semiconductor signal translating devices and methods of operation thereof, and more particularly, to semiconductor strain transducers.

The present invention sets forth a new and improved semiconductor signal translating device of the type described in my copending application, Ser. No. 183,940, filed Mar. 30, 1962, now abandoned, and assigned to the same assignee as the present application, and method of fabricating the device.

The present invention sets forth a simple strain transducer in which the number of mechanical linkages is reduced to the essential minimum and comprises a thin semiconductor wafer, containing a junction, as the pressure sensitive diaphragm and the necessary clamps as the electrodes. The anisotropic stress required may be achieved by the use of a stylus, as previously described in my copending application, by the reduction in the dimensions of a small portion of the semiconductor wafer.

The invention will be better understood as the following description proceeds, taken in conjunction with the accompanying drawings, in which.

In a device utilizing the anisotropic strain effect, a semiconductor element having a P-N junction therein is disposed so that a stressing mechanism such as a stylus is applied to the body in a manner that anisotropic stress is applied to a localized region of the junction, whereby changes in junction characteristics occur. This mechanism is particularly of value in that the amplitude of movement required in such devices is small, and it is preferable that the amount of power supplied to the translating device be small.

Figure 1:
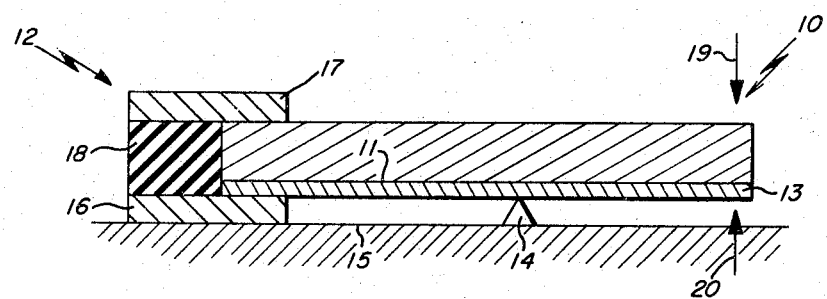
FIG. 1 shows a strain transducer of the cantilever type utilizing a stylus mechanism.

There is shown in FIG. 1 a strain transducer in which the number of mechanical linkages required to produce a signal translating device is reduced to a minimum and comprises a semiconductor body 10 having a junction 11 therein, held in a cantilevered position by electrode device 12, so that a surface 13 of body 10 is in contact with a stylus 14. Stylus 14 is mechanically supported by member 15 which also aids in supporting electrode device 12.

Electrode device 12 may comprise a first electrode 16, in contact with surface 13, and maintained in fixed relationship to a second electrode 17 by means of an insulator 18. The electrodes 16 and 17 with insulator 18 further provide a supporting means whereby body 10 is held in a cantilevered position. In such a device as shown in FIG. 1, when pressure is applied to the free, unsupported end of body 10 along the direction of the arrow 19, stylus 14 presses against surface 13, whereupon anisotropic stress is created across junction 11, thus permitting a measurement by way of electrodes 16 and 17 of the applied force, since anisotropic stress applied to the junction will cause a change in the junction characteristics, as explained in my copending application. If the device is such that stylus 14 has continuously been applying a force to surface 13, whereupon a stress is maintained across junction 11, a change in junction characteristics can also be obtained by relieving the pressure bias so applied to the junction. The pressure relief force would be applied in the direction of the arrow 20. In either event, that is upon the subjection of junction 11 to a stress or upon relief of a stress applied to junction 11, a resultant change in junction characteristics would be obtained and may be measured by means of electrodes 16 and 17 by adequate means, as would be well known to the semiconductor art.

Figure 2:
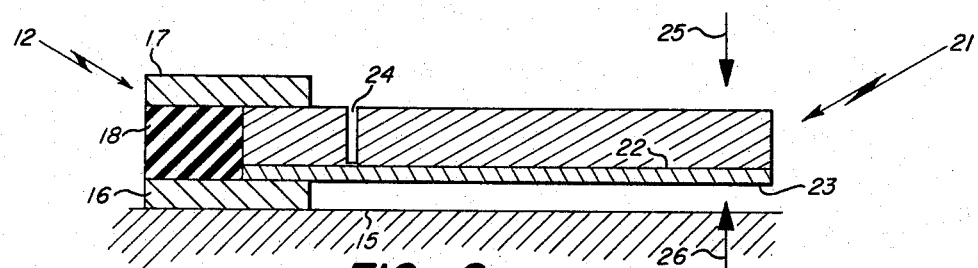
FIG. 2 shows a strain transducer of the cantilever type utilizing a reduction in the dimension of a small portion of the semiconductor body.

FIG. 2 illustrates a second strain transducer of the cantilever type and comprises a body 21 having a junction therein, held at one end by an electrode mechanism 12 identical to the electrode mechanism shown in FIG. 1, also supported by member 15. However, instead of achieving the appropriate stress concentration by means of a pointed stylus pressing against surface 23, an incision 24 in one side of the body 21 close to the support member 12 is used. Incision 24 is preferably made in body 21 to a depth close to but not touching junction 22. Incision 24 may be in the form of a saw cut or V-shaped groove or any other suitable reduction in at least one dimension of body 21 such as thickness so that anisotropic stress will be applied to a small area of junction 22. As indicated, it is preferable that incision 24 be made close to the clamped end of body 21 so that a force applied along the line shown by arrows 25 and 26 will take advantage of the mechanical leverage and cause anisotropic stress to appear in junction 22 at the base of incision 24, thus enabling one to obtain a variation in the electrical characteristics of junction 22 in proportion to the force applied in the direction of either arrow 25 or 26.

Figure 3:
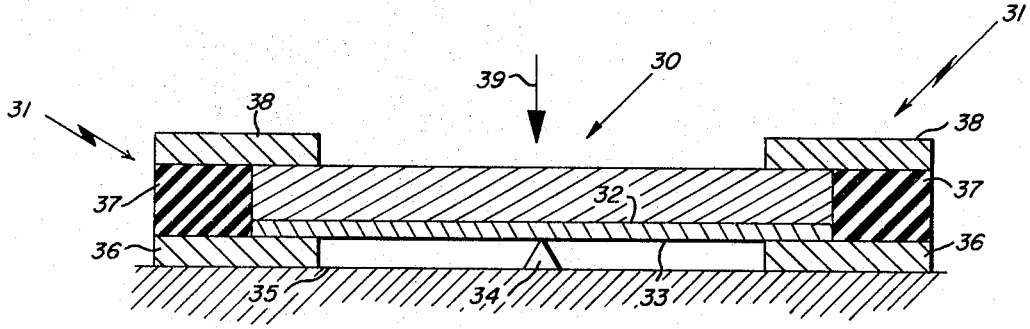
FIG. 3 shows a strain transducer wherein the semiconductor body is utilized as a diaphragm in conjunction with a stylus.

FIG. 3 shows a strain transducer where a thin diaphragm of semiconductor material 30 is maintained in an annular electrode support 31. Body 30 has contained therein at least one junction 32 and further has a surface 33 being maintained in contact with a stylus mechanism 34. Stylus mechanism 34 is maintained by any suitable mechanical force such as member 35. The annular electrode member 31 preferably comprises an electrode means 36 maintained by a support 35. Electrode 36 preferably consists, for example, of a flat, annular ring. Body 30 rests against the uppermost surface of this ring. An insulative medium 37 then surrounds and protects the edge of body 30, with a second electrode means 38 being applied to the upper exposed surface of body 30. Electrode 38 is, of course, maintained separate and insulated from electrode 36 by means of insulator 37. When a force is applied to the center of body 30 along the line 39, an appropriate change in the electrical characteristics of junction 32 is obtained since anisotropic stress is applied to junction 32 by virtue of stylus 34, as previously explained in conjunction with FIG. 1.

Figure 4:
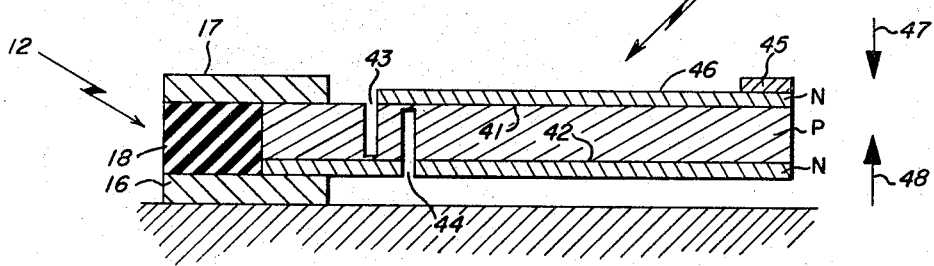
FIG. 4 illustrates a transistor device utilizing the present invention.

FIG. 4 illustrates a device utilizing the principles shown in FIG. 2. However, in this instance, the body 40 contains at least two junctions 41 and 42. The body 40 further has two incisions or reductions in thickness 43 and 44. The incisions are made such that incision 43 penetrates close to junction 42 and incision 44 penetrates close to junction 41. An electrode structure 12, as shown and described in FIG. 2, maintained at one end of body 40 with incisions 43 and 44 being made close to electrode member 12. A third electrode 45 is made on surface 46 of body 40 so that signals may be obtained across both junctions 41 and 42 when forces are applied to body 40 in the direction of arrow 47 or arrow 48. When a force is applied along the direction of arrow 47 or 48, stresses are applied to junctions 41 and 42. Stresses will, of course, concentrate in the base of incisions 43 and 44, as previously explained in conjunction with FIG. 2. By means of two incisions and two junctions, it can be seen that the applied force can be detected by a change in electrical characteristics of both junctions 43 and 44.

The advantages of the described devices are that the number of mechanical linkages in the utilization of the anisotropic strain effect, is reduced to a minimum, thus eliminating power loss, undesirable resonances and additional mass and bulk.

The devices described further present significant improvement in performance in view of these concessions, and also provide means whereby simple microphones, hydrophones and other P-N strain transducers may be built and utilized. It should be noted that the present invention is not limited to the particular materials described above. For example, the semiconductor bodies described could consist of germanium, silicon or other materials such as the so-called Group III–V or II–VI compounds. The stylus described may consist of a knife edge or wedge or other device suitable for introducing anisotropic strain effect in the body. The electrodes can consist of copper, lead, tin or other suitable electrodes as well known to the semiconductor art.

This completes the description of the preferred embodiment of the invention. However, many modifications of the invention will be apparent to persons skilled in the art. Accordingly, it is desired that this invention not be limited except as defined by the appended claims.

We claim:

1. A semiconductor device comprising a semiconductor body having a first surface and an opposing second surface and a P-N junction extending parallel with and closer to said first surface, an electrode structure comprising an insulating member at one end of the body, a first electrode carried by said insulating member and bearing upon said first surface of the body, and a second electrode carried by said insulating member and bearing on said second surface of the body, said electrodes being maintained in insulated spaced apart relationship with one another by said insulating member, an incision in said body extending from said second surface to a point adjacent said P-N junction, and means for physically restraining one end of the body at one side of the incision whereby when force is applied to one of said surfaces of the body at the opposite side of the incision changes occur in electrical characteristics of the junction at a location adjacent the incision.

2. A semiconductor device comprising a semiconductor body having a first surface and an opposing second surface, a first P-N junction extending parallel with said first surface, and a second P-N junction extending parallel with said second surface, said first and second junctions lying respectively closer to the respective first and second surfaces, a first incision in said body extending from said first surface through said first P-N junction to a point adjacent said second P-N junction, a second incision in said body extending from said second surface through said second P-N junction to a point adjacent said first P-N junction, and a clamping structure for physically insulating one end of the body at one side of said incisions comprising an insulating member, a first electrode carried by said insulating member and bearing on said first surface of the body, and a second electrode carried by said insulating member and bearing on said second surface of the body, and means for applying force to one of said surfaces of the body at the opposite side of the incisions whereby cantilever action of the body occurs and changes occur in electrical characteristics of the junctions at locations adjacent the incisions.

3. A semiconductor device comprising a semiconductor body having first and second opposing surfaces and a P-N junction therebetween, an electrode structure comprising an insulating member at one end of the body, a first electrode carried by said insulating member and bearing upon said first surface of the body, and a second electrode carried by said insulating member and bearing on said second surface of the body, said electrodes being maintained in insulated spaced apart relationship with one another by said insulating member, an incision in said body extending from one of said surfaces toward said junction and terminating adjacent thereto, and means for physically restraining one end of the body at one side of the incision whereby when force is applied to one of said surfaces of the body at the opposite side of the incision changes occur in electrical characteristics of the junction at a location adjacent the incision.

References Cited

UNITED STATES PATENTS

| | | | |
|---|---|---|---|
| 2,898,477 | 8/1959 | Hoesterey | 307—88.5 |
| 2,929,885 | 3/1960 | Mueller | 179—110.2 |
| 3,049,685 | 8/1962 | Wright | 317—235 |
| 3,132,408 | 5/1964 | Pell | 317—235 |
| 3,160,844 | 12/1964 | McLellan | 73—88.5 |
| 3,215,568 | 11/1965 | Pfann | 317—235 |

OTHER REFERENCES

"Experimental Tunnel-Diode Electromechanical Transducer Elements and Their Use In Tunnel-Diode Microphones," Journal of Acoustical Society of America, vol. 34, No. 7, July 1962.

JOHN W. HUCKERT, *Primary Examiner.*

J. R. SHEWMAKER, *Assistant Examiner.*